(12) United States Patent
Ploplis

(10) Patent No.: US 6,354,057 B1
(45) Date of Patent: Mar. 12, 2002

(54) SEAMLESS FLOOR-TO-WALL BASEBOARD AND METHODS

(76) Inventor: Michael K. Ploplis, 2212 Woodway Hills Dr., Apt. #1916, Matthews, NC (US) 28105

( * ) Notice: Subject to any disclaimer, the term of this patent is extended or adjusted under 35 U.S.C. 154(b) by 0 days.

(21) Appl. No.: 09/507,576

(22) Filed: Feb. 18, 2000

Related U.S. Application Data

(60) Provisional application No. 60/122,839, filed on Mar. 4, 1999.

(51) Int. Cl.[7] .............................................. E04F 19/04
(52) U.S. Cl. ...................... 52/716.1; 52/273; 52/287.1; 52/717.05; 52/746.1
(58) Field of Search ............................. 52/716.1, 716.2, 52/717.03, 717.04, 717.05, 745.2, 287.1, 288.1, 290, 35, 273, 276, 302.1, 631

(56) References Cited

U.S. PATENT DOCUMENTS

| | | | |
|---|---|---|---|
| 1,661,078 A | * 2/1928 | Mell ............................. | 52/273 |
| 1,739,077 A | * 12/1929 | Lisher et al. .................. | 52/273 |
| 1,883,117 A | * 10/1932 | Tompkins ................... | 52/716.1 |
| 2,111,922 A | * 3/1938 | Borkenstein ................ | 52/716.1 |
| 3,192,576 A | * 7/1965 | Wieting ........................ | 52/273 |
| 3,635,787 A | * 1/1972 | Shanok et al. ............. | 52/631 X |
| 5,243,798 A | * 9/1993 | Elliot ........................... | 52/273 |

FOREIGN PATENT DOCUMENTS

| | | | | |
|---|---|---|---|---|
| AU | 138165 | * | 8/1950 | ................... 52/273 |
| CH | 407510 | * | 8/1966 | ................. 52/287.1 |
| DE | 1053172 | * | 3/1959 | ................. 52/287.1 |
| DE | 3530528 | * | 4/1987 | ................. 52/287.1 |
| GB | 1023190 | * | 3/1966 | ................. 52/287.1 |

* cited by examiner

*Primary Examiner*—Laura A. Callo
(74) *Attorney, Agent, or Firm*—Adams, Schwartz & Evans, P.A.

(57) ABSTRACT

A seamless floor-to-wall baseboard for providing a sanitary, easy-to-clean transition from a resilient thermoplastic floor residing on a subfloor to a spaced-apart wall. The baseboard is fabricated from resilient thermoplastic flooring material having the same thickness as the floor. A plurality of longitudinally-extending parallel spaced-apart grooves are formed in one side of the baseboard for permitting the baseboard to be folded along its length to define a transition zone between a subfloor-engaging portion and a wall-engaging portion of the baseboard. The subfloor-engaging portion includes a distal side edge adapted for being abutted against and joined to a proximal edge of the floor to form a smooth, easy-to-clean joinder line. The wall-engaging portion is adapted to engage the wall at substantially right angles to the subfloor-engaging portion and at an angle relative to the transition zone of greater than 90 degrees.

8 Claims, 9 Drawing Sheets

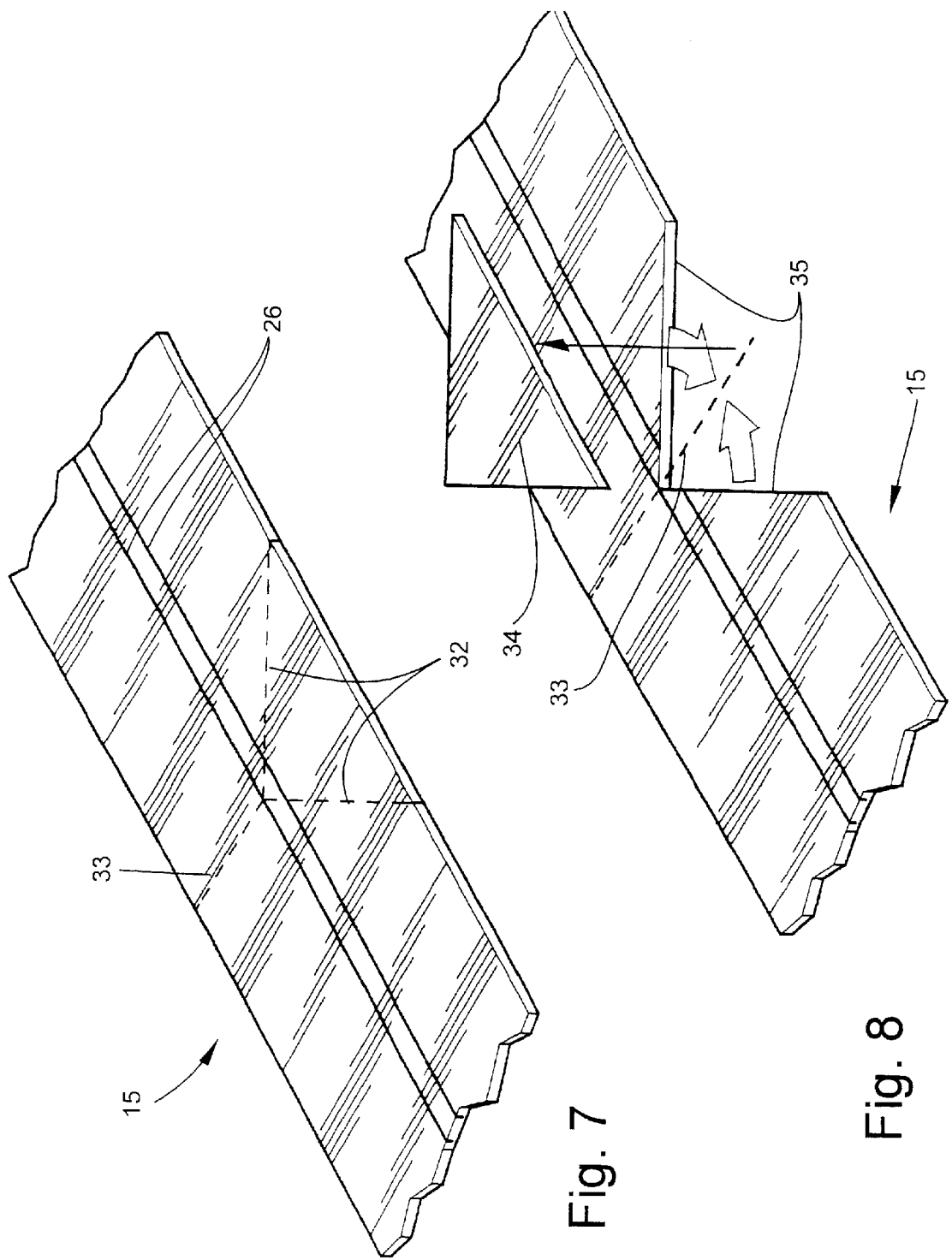

SEAMLESS FLOOR-TO-WALL BASEBOARD AND METHODS

This application relates to U.S. Provisional Patent Application Serial No. 60/122,839, filed on Mar. 4, 1999, and claims priority to that provisional application.

TECHNICAL FIELD AND BACKGROUND OF THE INVENTION

The present invention relates to a seamless floor-to-wall baseboard that is constructed from and is intended to accompany the installation of resilient thermoplastic flooring material such as the Protect-All® polyvinyl chloride (PVC) specialty flooring manufactured by Oscoda Plastics™, Inc.

The traditional baseboard product is applied to an intersection of a floor and a wall in such a manner as to leave a seam between the floor and the baseboard. This seam is usually imperfectly sealed, if it is sealed at all. Therefore, one or more gaps usually exist at the intersection of the floor and the baseboard. Water, waste, and other undesirable matter can accumulate in these areas, creating an unsanitary, difficult-to-clean condition as well as degradation of the structural integrity of the floor and the baseboard. In addition, the 90-degree angle typically formed by a traditional baseboard and a floor exacerbates the difficulty of maintaining a clean floor-to-wall transition. These problems present particularly unsatisfactory conditions in environments such as commercial food preparation facilities, i.e., kitchens in restaurants, catering firms, hospitals, and other institutions.

The present invention solves the problems presented by the traditional baseboard by providing a baseboard that creates a seamless, sanitary, easy-to-clean transition from the floor to the baseboard. The invention achieves this result by fabricating a baseboard from thermoplastic material of the same thickness as the thermoplastic material comprising the floor. A baseboard segment of the thermoplastic material is cut from a sheet of the material and one side of the baseboard segment is scored, allowing the baseboard segment to bend to fit the intersection of a subfloor and a wall. The scoring defines a wall-engaging portion and a subfloor-engaging portion of the baseboard as well as an angled transition zone of the baseboard between the wall-engaging portion and the subfloor-engaging portion. The longitudinal edge of the baseboard segment proximal to the perimeter edge of the floor is welded by heat or other means to the perimeter edge of the floor, creating a seamless, gap-free transition from the floor to the baseboard.

The ability of the invention to facilitate the maintenance of a clean floor and baseboard is further aided by the transition zone that is designed into the baseboard as a result of the scoring. The transition zone also enables the baseboard to allow for imperfections in wall construction by adjusting slightly by height and angle. In doing so it can easily conform to wall and subfloor imperfections that would normally make the installation of a traditional baseboard difficult or impossible.

In addition to the baseboard itself, the invention comprises a method for fabricating and installing the claimed baseboard as well as methods for adapting the claimed baseboard to corners formed by intersecting walls. The ease of the fabrication method allows the baseboard to be quickly fabricated at the jobsite, making fabrication both economical and convenient.

SUMMARY OF THE INVENTION

Therefore, it is an object of the invention to provide a seamless floor-to-wall baseboard.

It is another object of the invention to provide a seamless floor-to-wall baseboard that prevents the build-up of water, waste, and other undesirable matter at the transition between a subfloor and a wall.

It is another object of the invention to provide a seamless floor-to-wall baseboard that provides a seamless transition from floor to wall that will protect the structural integrity of the wall, the baseboard, and the floor.

It is another object of the invention to provide a seamless floor-to-wall baseboard that can be fabricated on site and installed to accompany resilient thermoplastic flooring.

It is another object of the invention to provide a seamless floor-to-wall baseboard constructed from custom-sized baseboard segments of thermoplastic flooring material.

It is another object of the invention to provide a seamless floor-to-wall baseboard that alters the inherent shape memory of the thermoplastic floor material such that it can be formed to the perimeter of a room.

It is another object of the invention to provide a seamless floor-to-wall baseboard designed with an angled transition zone that enables the baseboard to adapt to imperfections in subfloor and wall construction.

It is another object of the invention to provide a seamless floor-to-wall baseboard that may be adapted to corners formed by intersecting walls.

It is another object of the invention to provide a method of fabricating and installing a seamless floor-to-wall baseboard.

It is another object of the invention to provide methods of adapting the claimed baseboard to corners formed by intersecting walls.

These and other objects of the present invention are achieved in the preferred embodiments disclosed below by providing a seamless floor-to-wall baseboard for providing a sanitary, easy-to-clean transition from a resilient thermoplastic floor residing on a subfloor to a spaced-apart wall. The baseboard is fabricated from resilient thermoplastic flooring material having the same thickness as the floor. A plurality of longitudinally-extending parallel spaced-apart grooves are formed in one side of the baseboard for permitting the baseboard to be folded along its length to define a transition zone between a subfloor-engaging portion and a wall-engaging portion of the baseboard. The subfloor-engaging portion includes a distal side edge adapted for being abutted against and joined to a proximal edge of the floor to form a smooth, easy-to-clean joinder line. The wall-engaging portion is adapted to engage the wall at substantially right angles to the subfloor-engaging portion and at an angle relative to the transition zone of greater than 90 degrees.

According to one preferred embodiment of the invention, the grooves have a depth approximately equal to one-half the thickness of the baseboard.

An embodiment of a method according to the invention is provided for constructing a seamless floor-to-wall baseboard from a resilient thermoplastic floor material with the same thickness as a corresponding resilient thermoplastic floor. The method includes the steps of cutting a longitudinal baseboard segment of predetermined width from a sheet of the thermoplastic flooring material, scoring one side of the baseboard segment to define first and second longitudinally-extending parallel spaced-apart grooves for permitting the baseboard segment to be folded along its length to define a transition zone between a subfloor-engaging portion and a wall-engaging portion, and folding the baseboard segment along the grooves. The method further includes the subsequent step of positioning the baseboard segment such that the subfloor-engaging portion engages the subfloor and the wall-engaging portion engages the wall, a longitudinal edge of the subfloor-engaging portion and proximal edge of the floor define a narrow seam, and the baseboard segment blocks the intersection of the subfloor and the wall from intrusion by waste and other undesirable matter. The method further includes the subsequent steps of adhering the subfloor-engaging portion to the subfloor and the wall-engaging portion to the wall, and closing the narrow seam defined by the longitudinal edge of the subfloor-engaging portion and the proximal edge of the floor to provide a smooth, seamless transition from the wall to the floor.

Another embodiment of a method according to the invention is provided, wherein prior to the step of positioning the baseboard segment, the method further includes the steps of applying the floor to the entire subfloor and removing a portion of the floor residing along the perimeter of the subfloor to accommodate the positioning of the baseboard segment.

Another embodiment of a method according to the invention is provided, wherein prior to the step of positioning the baseboard segment, the method further includes the step of applying the floor to the subfloor such that a perimeter portion of the subfloor remains exposed to accommodate the positioning of the baseboard segment.

An embodiment of a method according to the invention is provided for constructing a seamless floor-to-wall baseboard from a resilient thermoplastic flooring material with the same thickness as a resilient thermoplastic floor to be applied to a corresponding subfloor. The method includes the steps of cutting a longitudinal baseboard segment of predetermined width from a sheet of the thermoplastic flooring material, scoring one side of the baseboard segment to define first and second longitudinally-extending parallel spaced-apart grooves for permitting the baseboard to be folded along its length to thereby define a transition zone between a subfloor-engaging portion and a wall-engaging portion, and folding the baseboard segment along the grooves. The method further includes the subsequent step of positioning the baseboard segment such that the subfloor-engaging portion engages the subfloor and the wall-engaging portion engages the wall and such that the baseboard segment blocks the intersection of the subfloor and the wall from intrusion by waste and other undesirable matter. The method further includes the subsequent steps of adhering the subfloor-engaging portion to the subfloor and the wall-engaging portion to the wall, applying the floor to the subfloor such that a longitudinal edge of the subfloor-engaging portion and a proximal edge of the floor define a narrow seam, and closing the narrow seam defined by the longitudinal edge of the subfloor-engaging portion and the proximal edge of the floor to provide a smooth, seamless transition from the wall to the floor.

Another embodiment of a method according to the invention is provided, wherein prior to the step of positioning the baseboard segment, the method further includes the step of beveling a longitudinal edge of the wall-engaging portion of the baseboard segment.

Another embodiment of a method according to the invention is provided, wherein the step of closing the narrow seam defined by the longitudinal edge of the subfloor-engaging portion and the proximal edge of the floor includes welding the longitudinal edge of the subfloor-engaging portion and the proximal edge of the floor to form a seamless transition from the baseboard segment to the floor.

An embodiment of a method according to the invention is provided for constructing a seamless floor-to-wall baseboard from a resilient thermoplastic flooring material and adapting the baseboard to an inside corner. The method includes the steps of cutting a longitudinal baseboard segment of predetermined width from a sheet of the thermoplastic flooring material, scoring one side of the baseboard segment to define first and second longitudinally-extending parallel spaced-apart grooves for permitting the baseboard segment to be folded along its length, removing a section of the baseboard segment to define complimentary edges that may be joined to form an inside corner baseboard segment for application to an inside corner, joining the complimentary edges of the baseboard segment defined by the step of removing to form the inside corner baseboard segment for application to the inside corner. The method further includes the subsequent step of forming the inside corner baseboard segment to the inside corner such that the inside corner baseboard segment is folded along the grooves to define a subfloor-engaging portion, a wall-engaging portion, and a transition zone between the subfloor-engaging portion and the wall-engaging portion, and such that the subfloor-engaging portion of the inside corner baseboard segment engages the subfloor and the wall-engaging portion of the inside corner baseboard segment engages converging walls, and such that the inside corner baseboard segment blocks the intersection of the subfloor and the converging walls from intrusion by waste and other undesirable matter. The method further includes the subsequent step of adhering the subfloor-engaging portion of the inside corner baseboard segment to the subfloor and the wall-engaging portion of the inside corner baseboard segment to the converging walls.

Another embodiment of a method according to the invention is provided, wherein prior to the step of forming the inside corner baseboard segment, the method further includes the step of beveling a longitudinal edge of the wall-engaging portion of the inside corner baseboard segment.

An embodiment of a method according to the invention is provided for constructing a seamless floor-to-wall baseboard from a resilient thermoplastic flooring material and adapting the baseboard to an outside corner. The method includes the steps of cutting a longitudinal baseboard segment of predetermined width from a sheet of the thermoplastic flooring material, scoring one side of the baseboard segment to define first and second longitudinally-extending parallel spaced-apart grooves for permitting the baseboard segment to be folded along its length, removing a section of the baseboard segment to create two smaller baseboard segments with complimentary edges that may be joined to form an outside corner baseboard segment for application to an outside corner, and joining the complimentary edges of the smaller baseboard segments defined by the step of removing to form the outside corner baseboard segment for application to the outside corner. The method further includes the subsequent step of forming the outside corner baseboard segment to the outside corner such that the outside corner baseboard segment is folded along the grooves to define a subfloor-engaging portion, a wall-engaging portion, and a transition zone between the subfloor-engaging portion and the wall-engaging portion, and such that the subfloor-engaging portion of the outside corner baseboard segment engages the subfloor and the wall-engaging portion of the outside corner baseboard segment engages converging walls, and such that the outside corner baseboard segment blocks the intersection of the subfloor and the converging walls from intrusion by waste and other undesirable matter. The method further includes the subsequent step of adhering the subfloor-engaging portion of the outside corner baseboard segment to the subfloor and the wall-engaging portion of the outside corner baseboard segment to the converging walls.

Another embodiment of a method according to the invention is provided, wherein prior to the step of forming the outside corner baseboard segment, the method further includes the step of beveling a longitudinal edge of the wall-engaging portion of the outside corner baseboard segment.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 7 is a perspective view of a length of uninstalled baseboard segment, with dotted lines showing where the two cuts needed to form an inside corner baseboard segment are made;

FIG. 8 is an exploded view of the uninstalled baseboard segment of FIG. 7;

DESCRIPTION OF THE PREFERRED EMBODIMENT AND BEST MODE

Figure 1:
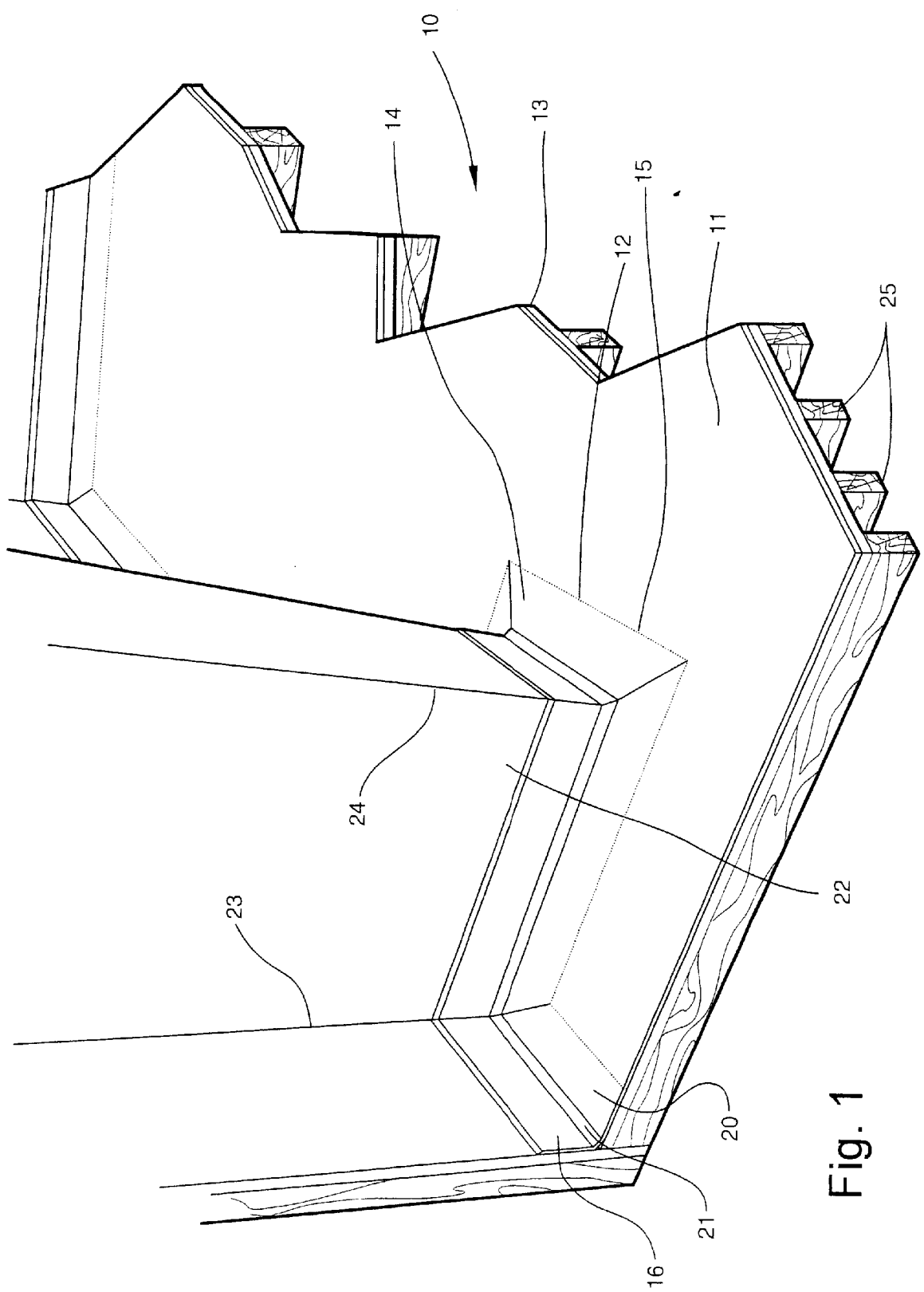
FIG. 1 is a fragmentary perspective view of the floor perimeter of a room with the floor and the present baseboard invention installed.

Referring now specifically to the drawings, a floor perimeter of a room with a floor and a baseboard according to the present invention is illustrated broadly at reference numeral 10 in FIG. 1. Generally, to form a seamless transition from a floor to a wall, a resilient thermoplastic floor 11 on a subfloor 13 and having a perimeter edge 12 is joined to a baseboard segment 14 with a longitudinal edge 15. The baseboard segment 14 has a wall-engaging portion 16, a subfloor-engaging portion 20, and a transition zone 21 between the wall-engaging portion 16 and the subfloor-engaging portion 20. The wall-engaging portion 16 of the baseboard segment 14 is adhered to a wall 22 and the subfloor-engaging portion 20 of the baseboard segment 14 is adhered to the subfloor 13. The baseboard segment 14 may also be formed to both an inside corner 23 and an outside corner 24. An "inside corner" is a corner formed by two walls intersecting at an angle of less than 180 degrees. An "outside corner" is a corner formed by two walls intersecting at an angle of more than 180 degrees, i.e., a reflex angle. The baseboard segment 14 may be used with a plywood subfloor 13 supported by joists 25, a concrete slab subfloor (not shown), or any other stable subfloor construction.

Figure 2:
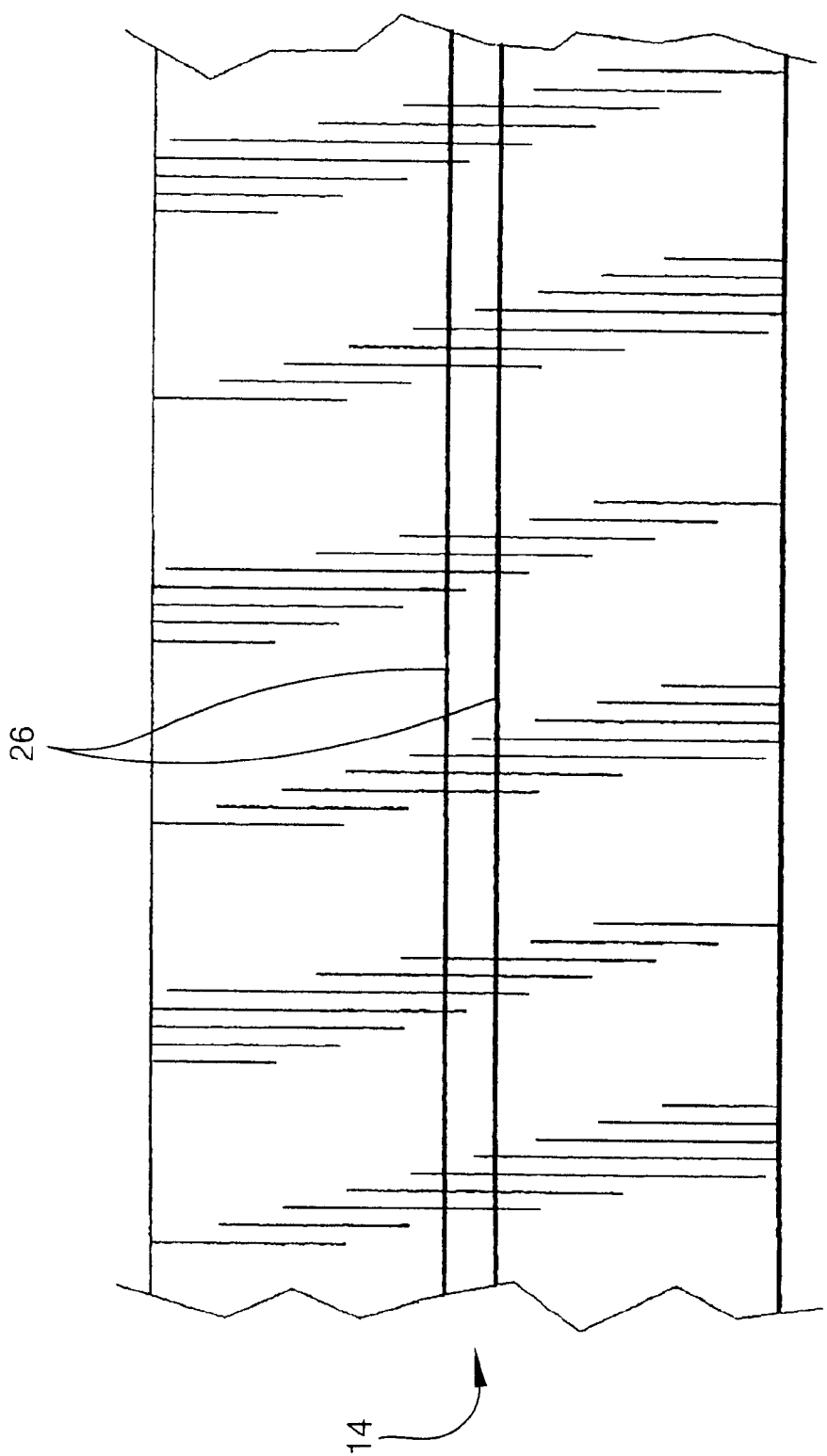
FIG. 2 is a top plan view of a scored, uninstalled baseboard segment.
Figures 3, 4:
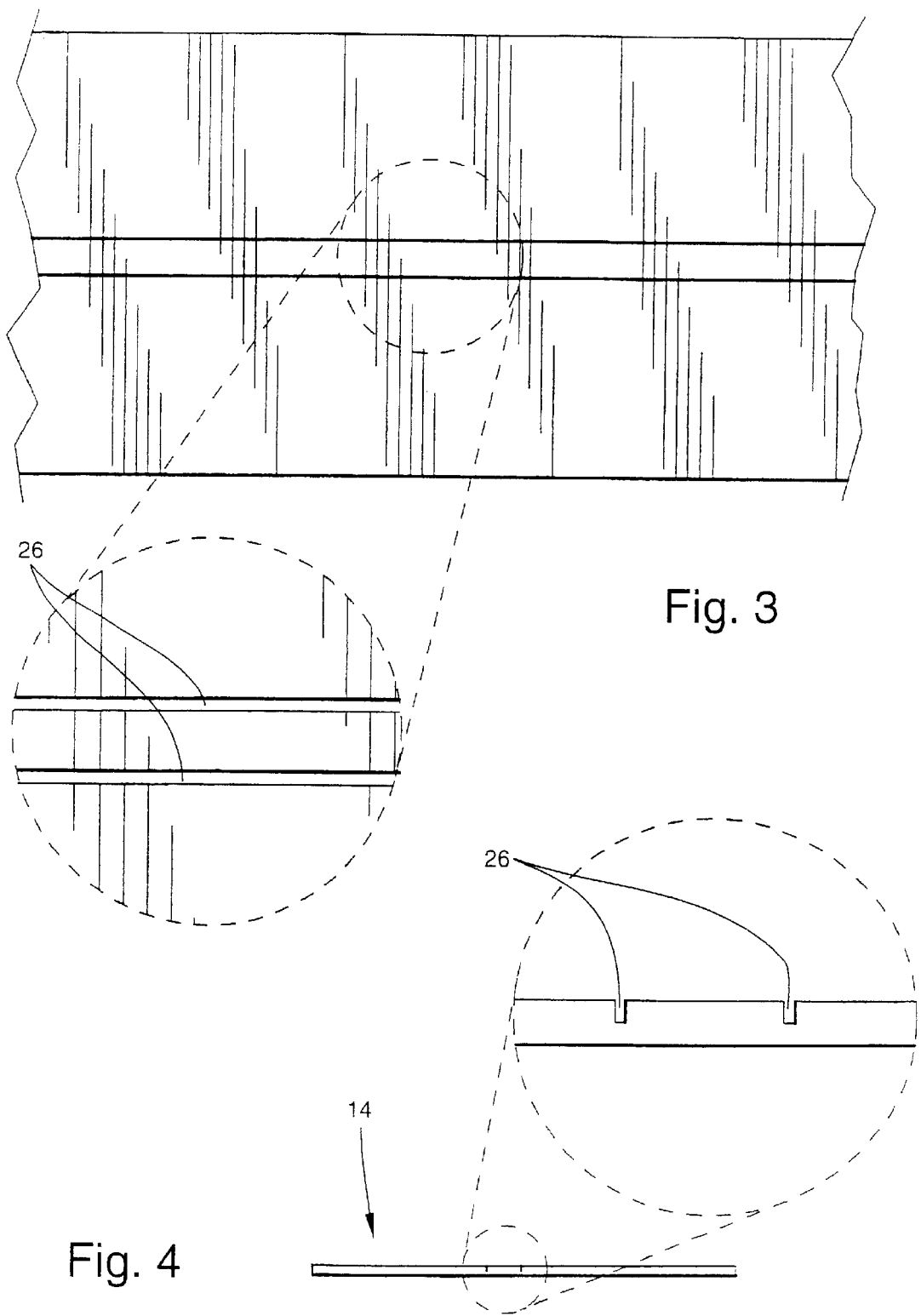
FIG. 3 is a view as in FIG. 2 but with an enlarged view of a portion of the baseboard segment to show the scoring more clearly.
FIG. 4 is a plan view of an end edge of an uninstalled baseboard segment with an enlarged view of a portion of the end edge of the uninstalled baseboard segment in order to show the scoring more clearly.

The baseboard segment 14 is fabricated by cutting it from a sheet of resilient thermoplastic flooring material of the same thickness as the floor 11 applied to the corresponding subfloor 13; the same flooring material maybe used for both the floor and the baseboard. As shown broadly in FIG. 2, the baseboard segment 14 includes two longitudinally-extending, parallel, spaced-apart grooves 26. See FIG. 3. As shown in FIG. 4, the grooves 26 extend through approximately one-half of the thickness of the baseboard segment 14. Although only two grooves are shown, any plurality of grooves could be used to form the gradual nature of the transition zone that provides the baseboard with a well-exposed, easy-to-clean surface.

Figure 5:
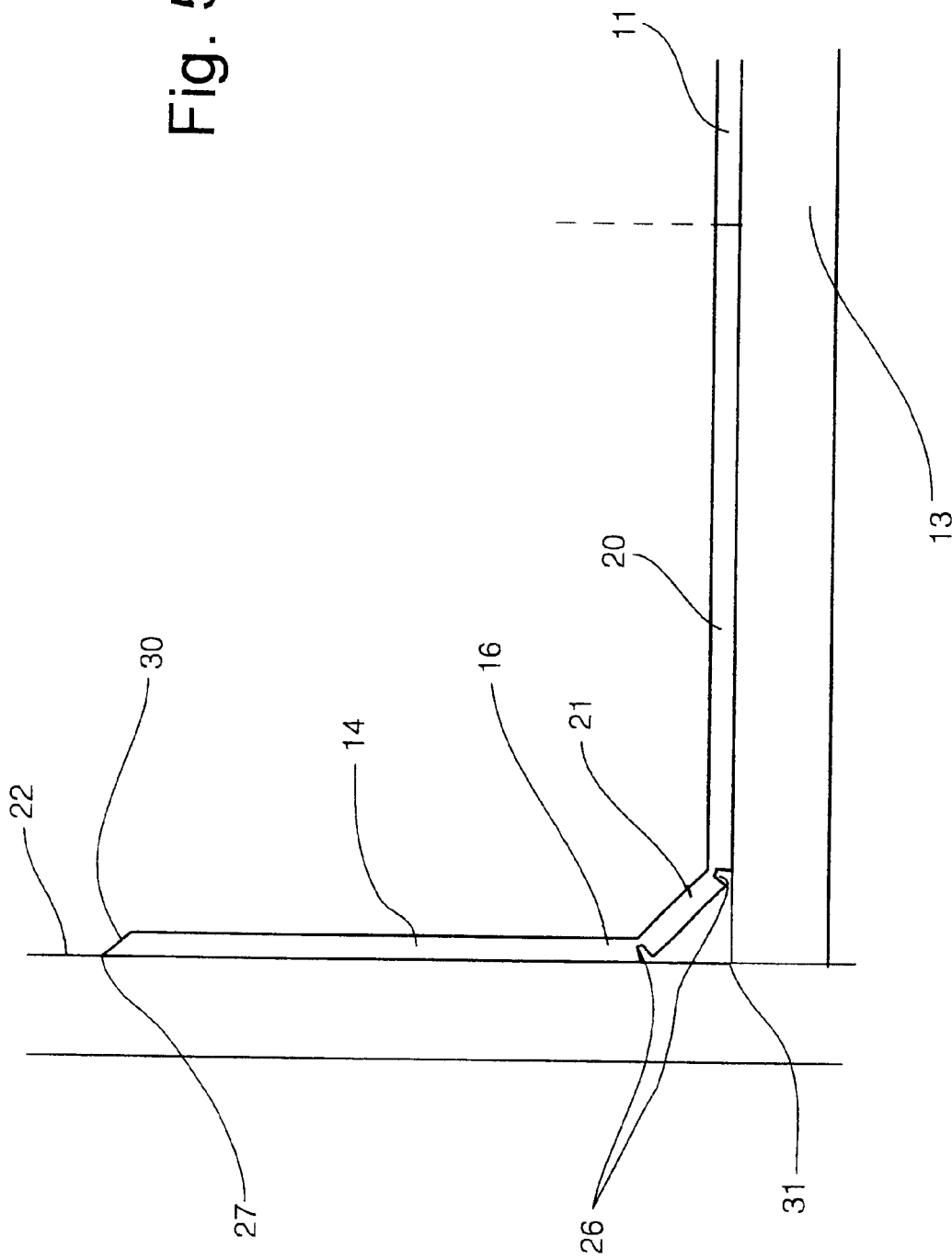
FIG. 5 is a cross-sectional view of an installed baseboard, including the wall, subfloor, and floor engaged by the baseboard.

As shown in FIG. 5, the grooves 26 enable the baseboard segment 14 to be formed to the shape of the intersecting wall 22 and subfloor 13. The grooves 26 also provide some flexibility in the baseboard segment 14 to allow for imperfections in wall and subfloor surfaces. To form the baseboard segment 14 to an intersection 31 of the wall 22 and the subfloor 13, the baseboard segment 14 is folded along the grooves 26 to form two angles of greater than 90 degrees. The baseboard segment 14 is positioned such that the wall-engaging portion 16 engages the wall 22 and the subfloor-engaging portion 20 engages the subfloor 13. A longitudinal edge 27 of the wall-engaging portion 16 of the baseboard segment 14 is characterized by a bevel 30 that forms an angle of at least 135 degrees relative to the wall 22. The bevel 30, the transition zone 21, and the greater-than-90-degree angles formed by the transition zone 21, the wall-engaging portion 16, and the subfloor-engaging portion 20 provide an attractive, easy-to-clean transition from the floor 11 to the wall 22 that prevents build-up of water, waste, and other undesirable matter.

Figure 6:
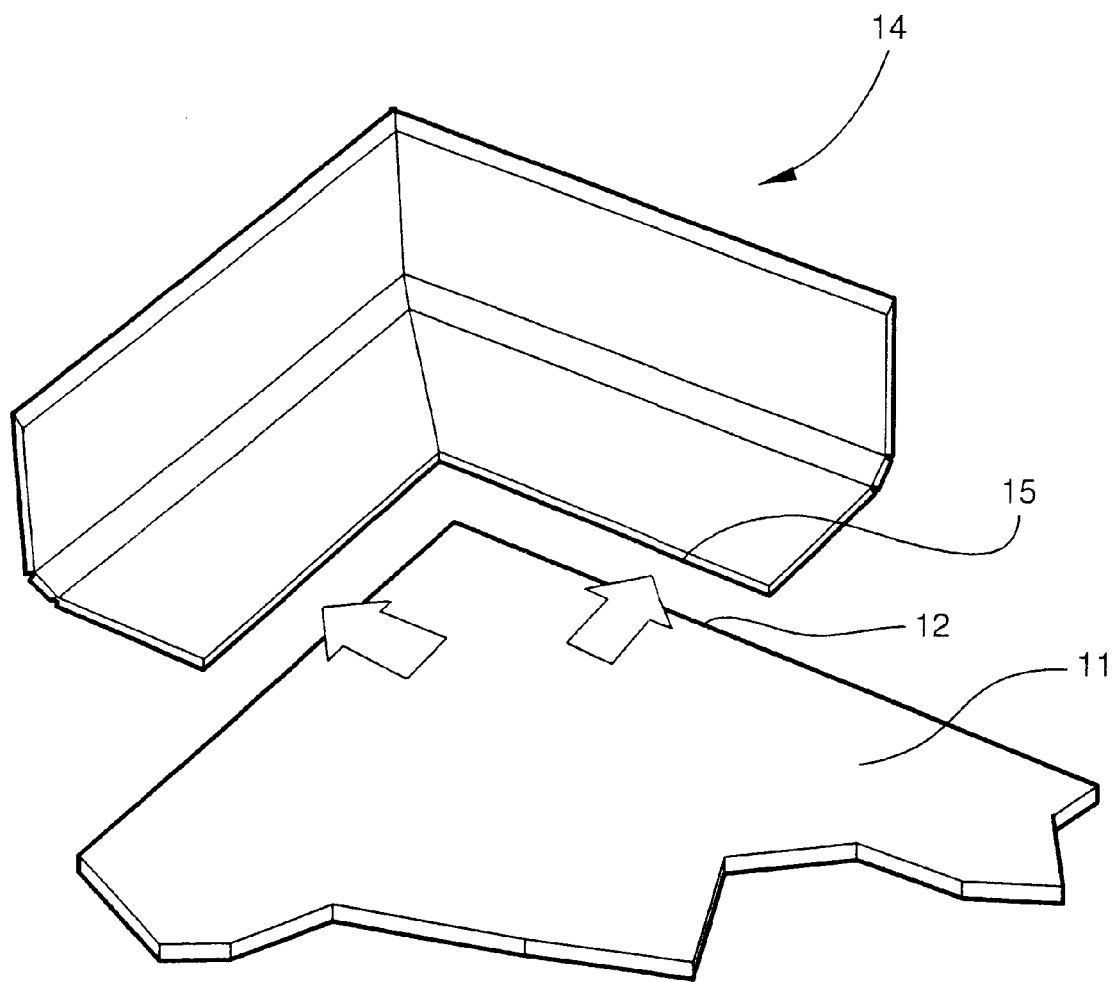
FIG. 6 is a fragmentary exploded perspective view of the floor covering and the baseboard as it is applied to an inside corner.

Referring now to FIG. 6, the longitudinal edge 15 of the baseboard segment 14 is joined, preferably by heat welding, with the perimeter edge 12 of the floor 11 to create a seamless transition from the floor 11 to the baseboard segment 14, thereby preventing water, waste, and other undesirable matter from lodging between the floor 11 and the baseboard segment 14.

Figure 9:
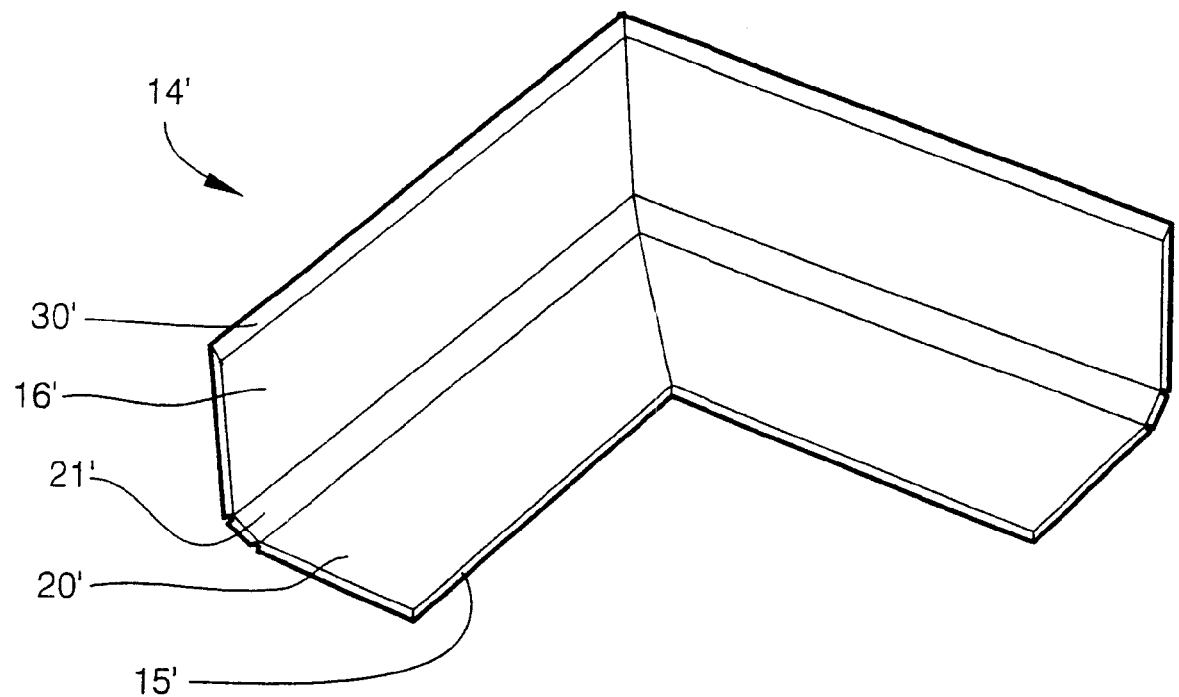
FIG. 9 is a perspective view of an inside corner baseboard segment of the baseboard.

As is shown in FIG. 7, cuts are made along lines 32 to form a length of baseboard segment 14 to an inside corner. The lines 32 are shown in relation to a reference line 33 situated perpendicular to the longitudinal axis of the baseboard segment 14, which is represented by the grooves 26. As is shown in FIG. 8, a triangular portion 34 of the baseboard segment 14 is cut from the baseboard segment 14. After the triangular portion 34 is removed from the baseboard segment 14, complimentary edges 35 of the baseboard segment 14 exposed by the removal of the triangular portion 34 are joined by pulling them together until they meet at the reference line 33, where the edges 35 are welded together to form a three-dimensional structure. A finished inside corner baseboard segment 14' fabricated using this method is shown in FIG. 9 along with identifications of some of the elements of the inside corner baseboard segment 14' that correspond to the elements set forth in the foregoing description of the invention.

Figure 10:
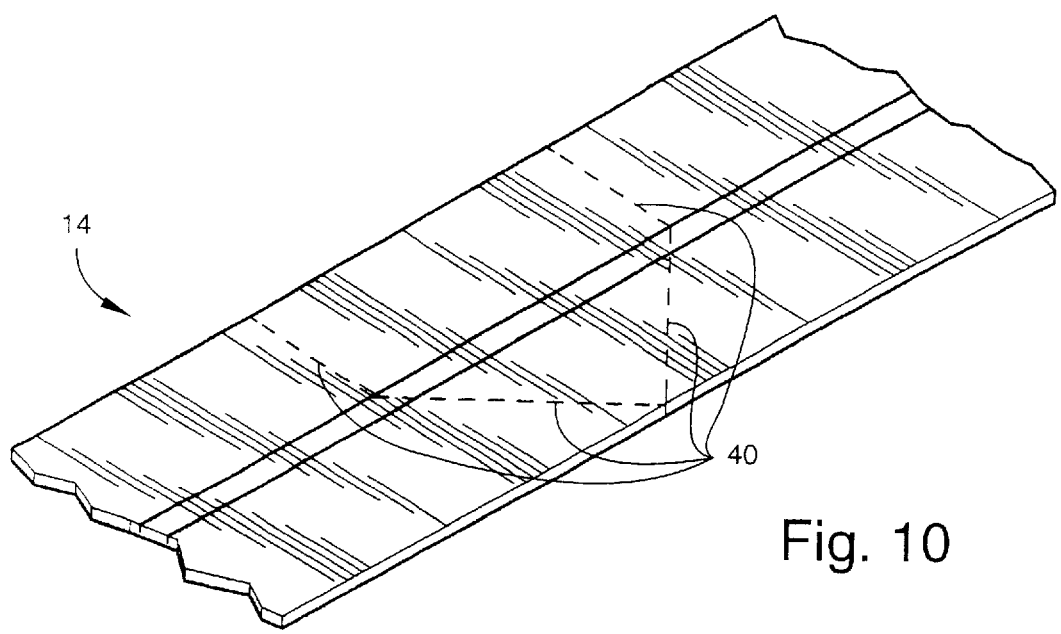
FIG. 10 is a perspective view of a length of uninstalled baseboard segment, with dotted lines showing where the cuts needed to form an outside corner baseboard segment are made.
Figure 11:
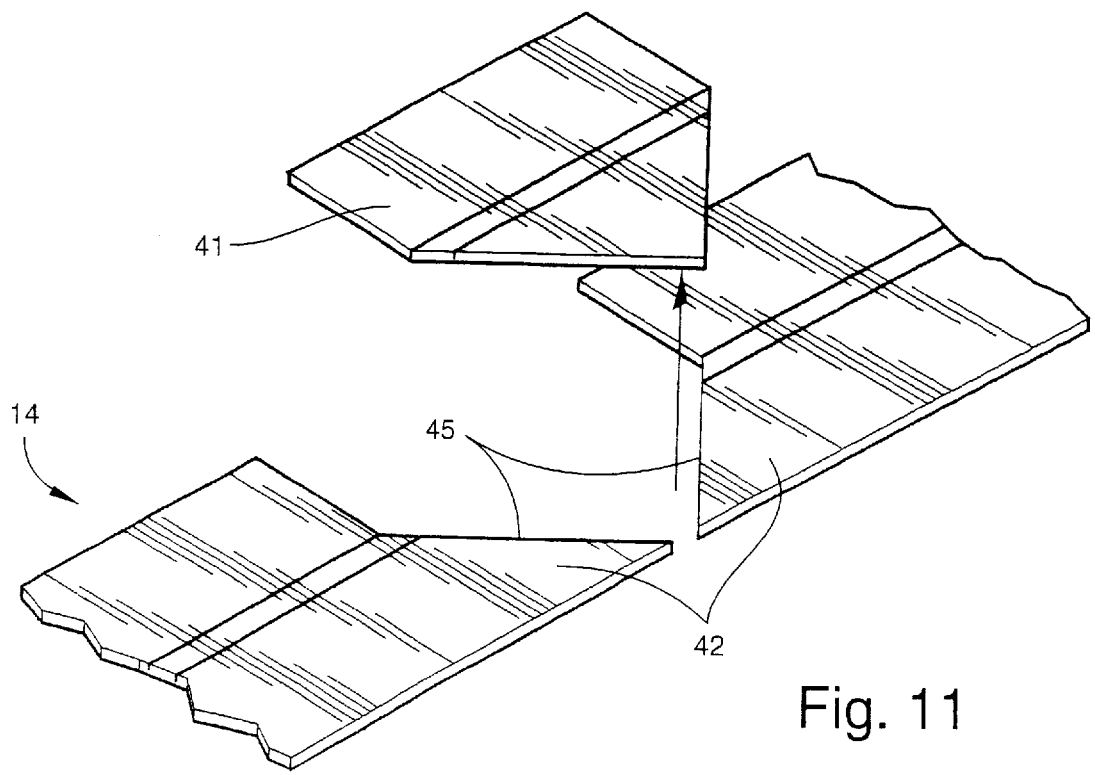
FIG. 11 is an exploded view of the uninstalled baseboard segment of FIG. 10.
Figure 12:
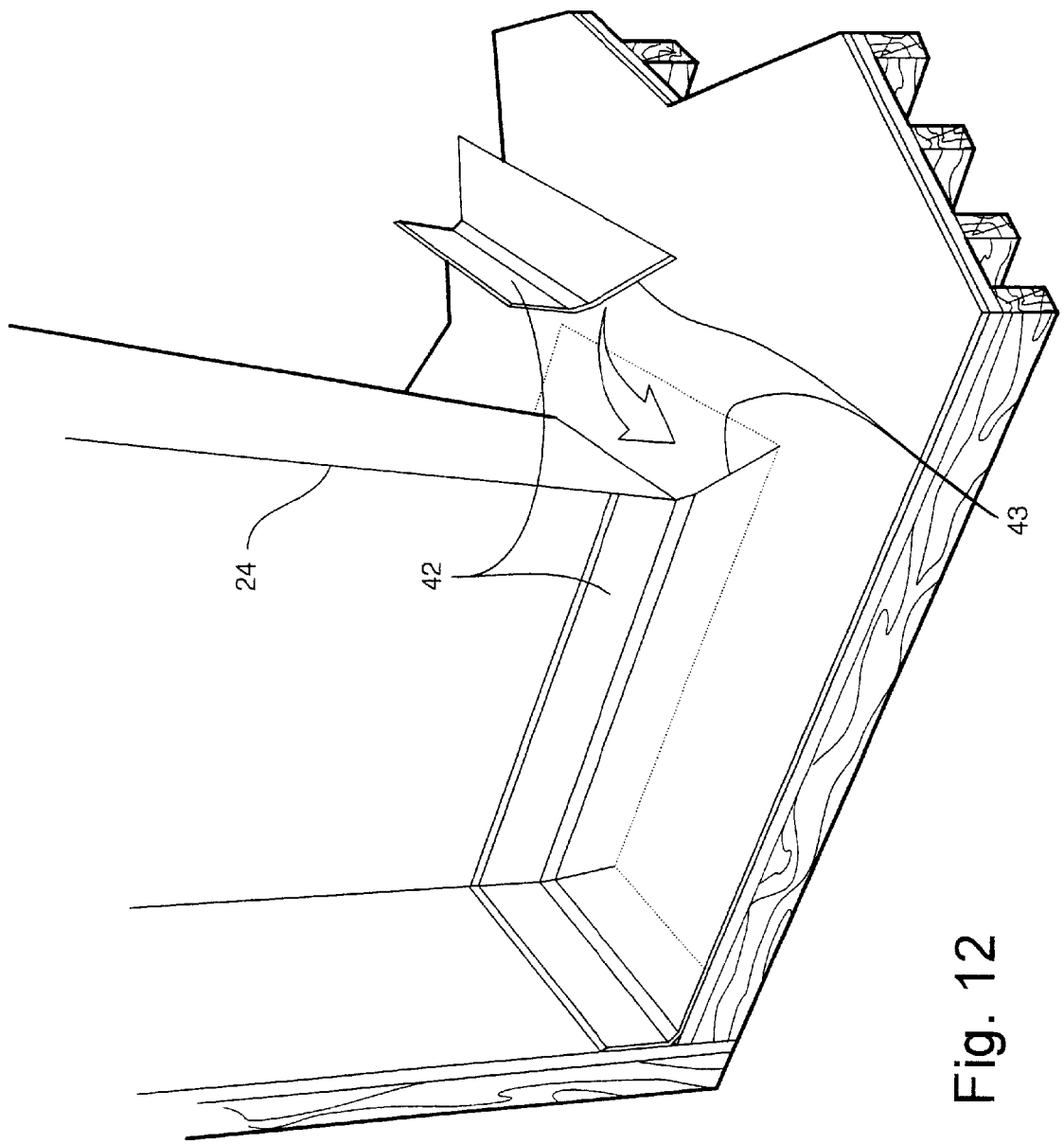
FIG. 12 is a fragmentary exploded perspective view of the floor perimeter of a room, showing how two smaller complimentary baseboard segments are used to form an outside corner baseboard segment.

Referring now to FIG. 10, cuts are made along lines 40 to form a length of baseboard segment 14 to an outside corner. A pentagonal portion 41 is cut from the baseboard segment 14. (FIG. 11) After the pentagonal portion 41 is removed from the baseboard segment 14, two smaller baseboard segments 42 with complimentary edges 43 remain. As shown in FIG. 12, the complimentary edges 43 of the two smaller baseboard segments 42 are joined to form to a shape which conforms to the outside corner 24.

A seamless floor-to-wall baseboard and methods for constructing the baseboard and adapting it to inside and outside corners are described above. Various details of the invention may be changed without departing from its scope. Furthermore, the foregoing description of the preferred embodiment of the invention and the best mode for practicing the invention are provided for the purpose of illustration only and not for the purpose of limitation-the invention being defined by the claims.

I claim:

1. A method for constructing a seamless floor-to-wall baseboard from a resilient thermoplastic flooring material and adapting the baseboard to an inside corner, said method comprising the steps of:
   (a) cutting a longitudinal baseboard segment of predetermined width from a sheet of the thermoplastic flooring material;
   (b) scoring one side of the baseboard segment to define first and second longitudinally-extending parallel spaced-apart grooves for permitting the baseboard segment to be folded along the length of said grooves;
   (c) removing a section of the baseboard segment to define complimentary edges that may be joined to form an inside corner baseboard segment for application to an inside corner;
   (d) joining the complimentary edges of the baseboard segment defined by said removing to form the inside corner baseboard segment for application to the inside corner;
   (e) forming the inside corner baseboard segment to the inside corner:
      (i) such that the inside corner baseboard segment is folded along the grooves to define a planar subfloor-engaging portion, a planar wall-engaging portion, and a planar transition zone between the subfloor-engaging portion and the wall-engaging portion;
      (ii) such that the subfloor-engaging portion of the inside corner baseboard segment engages the subfloor and the wall-engaging portion of the inside corner baseboard segment engages converging walls; and
      (iii) such that the inside corner baseboard segment blocks the intersection of the subfloor and the converging walls from intrusion by waste and other undesirable matter; and
   (f) adhering the subfloor-engaging portion of the inside corner baseboard segment to the subfloor and the wall-engaging portion of the inside corner baseboard segment to the converging walls.

2. A method for constructing a seamless floor-to-wall baseboard from a resilient thermoplastic flooring material and adapting the baseboard to an outside corner, said method comprising the steps of:
   (a) cutting a longitudinal baseboard segment of predetermined width from a sheet of the thermoplastic flooring material;
   (b) scoring one side of the baseboard segment to define first and second longitudinally-extending parallel spaced-apart grooves for permitting the baseboard segment to be folded along its length;
   (c) removing a section of the baseboard segment to create two smaller baseboard segments with complimentary edges that may be joined to form an outside corner baseboard segment for application to an outside corner;
   (d) joining the complimentary edges of the smaller baseboard segments defined by said removing to form the outside corner baseboard segment for application to the outside corner;
   (e) forming the outside corner baseboard segment to the outside corner:
      (i) such that the outside corner baseboard segment is folded along the grooves to define a planar subfloor-engaging portion, a planar wall-engaging portion, and a planar transition zone between the subfloor-engaging portion and the wall-engaging portion;
      (ii) such that the subfloor-engaging portion engages the subfloor and the wall-engaging portion engages converging walls; and
      (iii) such that the outside corner baseboard segment blocks the intersection of the subfloor and the converging walls from intrusion by waste and other undesirable matter; and
   (f) adhering the subfloor-engaging portion of the outside corner baseboard segment to the subfloor and the wall-engaging portion of the outside corner baseboard segment to the converging walls.

3. A seamless floor-to-wall baseboard for providing a sanitary, easy-to-clean transition from a resilient thermoplastic floor having a predetermined thickness and residing on a subfloor to a spaced-apart wall, and comprising:
   (a) said baseboard being fabricated from a resilient thermoplastic flooring material adapted to have the same thickness as the thickness of the floor;
   (b) a plurality of longitudinally-extending parallel spaced-apart grooves formed in one side of the baseboard for permitting the baseboard to be folded along the length of at least two of said spaced-apart grooves to thereby define a planar transition zone between a planar subfloor-engaging portion and a planar wall-engaging portion of the baseboard;
   (c) said subfloor-engaging portion having a distal side edge shaped for being abutted flush against and joined at all points thereon to a complementary-shaped proximal end edge of the floor to form a smooth, easy-to-clean joinder line lacking any space within which debris may collect;
   (d) the wall-engaging portion being adapted to engage the wall at substantially right angles to the subfloor-engaging portion and at an angle relative to the transition zone of greater than 90 degrees; and
   (e) the transition zone defining a transition between the wall-engaging portion and the subfloor-engaging portion to provide a well-exposed, easy-to-clean baseboard surface.

4. A baseboard according to claim 2, said grooves having a depth approximately equal to one-half of the thickness of said baseboard.

5. A method for constructing a seamless floor-to-wall baseboard from a resilient thermoplastic flooring material with the same thickness as a thermoplastic floor having a predetermined thickness and residing on a subfloor, said method comprising the steps of:

(a) cutting a longitudinal baseboard segment of predetermined width from a sheet of the thermoplastic flooring material;

(b) scoring one side of the baseboard segment to define first and second longitudinally-extending parallel spaced-apart grooves for permitting the baseboard segment to be folded along the length of said respective grooves to thereby define a planar transition zone between a planar subfloor-engaging portion and a planar wall-engaging portion of the baseboard segment;

(c) folding the baseboard segment along the grooves;

(d) positioning the baseboard segment such that:
   (i) the subfloor-engaging portion engages the subfloor and the wall-engaging portion engages the wall;
   (ii) a longitudinal distal side edge of the subfloor-engaging portion abutted flush against and joined at all points thereon to a complementary-shaped proximal end edge of the floor define a narrow seam lacking any space within which debris may collect; and
   (iii) the baseboard segment blocks the intersection of the subfloor and the wall from intrusion by waste and other undesirable matter.

(e) adhering the subfloor-engaging portion to the subfloor and the wall-engaging portion to the wall; and (f) closing the narrow seam defined by the longitudinal edge of the subfloor-engaging portion and the proximal edge of the floor to provide a smooth, seamless transition from the wall to the floor.

6. A method according to claim 5, wherein said closing comprises welding together the longitudinal distal side edge of the subfloor-engaging portion at all points thereon and the proximal end edge of the floor to form a seamless transition from the baseboard segment to the floor.

7. A method for constructing a seamless floor-to-wall baseboard from resilient thermoplastic flooring material with the same thickness as a floor having a predetermined thickness and to be applied to a corresponding subfloor, said method comprising the steps of:

(a) cutting a longitudinal baseboard segment of predetermined width from a sheet of the thermoplastic flooring material;

(b) scoring one side of the baseboard segment to define first and second longitudinally-extending parallel spaced-apart grooves for permitting the baseboard segment to be folded along its length of said respective grooves to thereby define a planar transition zone between a planar subfloor-engaging portion and a planar wall-engaging portion of the baseboard segment;

(c) folding the baseboard segment along the grooves;

(d) positioning the baseboard segment such that:
   (i) the subfloor-engaging portion engages the subfloor and the wall-engaging portion engages the wall; and
   (ii) the baseboard segment blocks the intersection of the subfloor and the wall from intrusion by waste and other undesirable matter;

(e) adhering the subfloor-engaging portion to the subfloor and the wall-engaging portion to the wall;

(f) applying the floor to the subfloor such that a longitudinal distal side edge of the subfloor-engaging portion of the baseboard segment and a proximal edge of the floor are abutted flush against and joined at all points to each other to define a narrow seam lacking any space within which debris may collect; and (g) closing the narrow seam defined by the longitudinal distal side edge of the subfloor-engaging portion of the baseboard segment and the complementary-shaped proximal edge of the floor to provide a smooth, seamless transition from the wall to the floor.

8. A method according to claim 7, wherein said closing comprises welding together at all points thereon the longitudinal distal side edge of the subfloor-engaging portion of the baseboard segment and the complementary-shaped proximal edge of the floor to form a seamless transition from the baseboard segment to the floor.

\* \* \* \* \*

UNITED STATES PATENT AND TRADEMARK OFFICE
CERTIFICATE OF CORRECTION

PATENT NO. : 6,354,057 B1
DATED : March 12, 2002
INVENTOR(S) : Ploplis, Michael K.

It is certified that error appears in the above-identified patent and that said Letters Patent is hereby corrected as shown below:

Column 8,
Line 60, delete "claim 2", and insert -- claim 3 --.

Column 10,
Line 19, after "matter" delete ";" (semicolon), and insert -- . -- (period).

Signed and Sealed this

Twenty-seventh Day of April, 2004

JON W. DUDAS
*Acting Director of the United States Patent and Trademark Office*